(12) United States Patent
Zhang et al.

(10) Patent No.: US 11,486,455 B2
(45) Date of Patent: Nov. 1, 2022

(54) DISC BRAKE AND PISTON BOOT

(71) Applicant: Hitachi Automotive Systems, Ltd., Ibaraki (JP)

(72) Inventors: Xuesheng Zhang, Ibaraki (JP); Shiro Nagashima, Ibaraki (JP); Ravindra Jayasekara, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 97 days.

(21) Appl. No.: 16/767,198

(22) PCT Filed: Nov. 28, 2018

(86) PCT No.: PCT/JP2018/043775
§ 371 (c)(1),
(2) Date: May 27, 2020

(87) PCT Pub. No.: WO2019/107407
PCT Pub. Date: Jun. 6, 2019

(65) Prior Publication Data
US 2020/0386284 A1    Dec. 10, 2020

(30) Foreign Application Priority Data
Nov. 28, 2017   (JP) .............................. JP2017-227825

(51) Int. Cl.
*F16D 55/226*    (2006.01)
*F16D 65/00*    (2006.01)
(Continued)

(52) U.S. Cl.
CPC ....... *F16D 55/226* (2013.01); *F16D 65/0068* (2013.01); *F16D 65/092* (2013.01);
(Continued)

(58) Field of Classification Search
CPC .. F16D 55/226; F16D 65/0068; F16D 65/092; F16D 65/18; F16D 2055/0016;
(Continued)

(56) References Cited

U.S. PATENT DOCUMENTS 3,998,466 A * 12/1976 Kondo .................... F16D 65/14
74/18.2
4,199,159 A    4/1980 Evans
(Continued)

FOREIGN PATENT DOCUMENTS

CN    203594715 U    5/2014
CN    108700194 A    10/2018
(Continued)

OTHER PUBLICATIONS

International Search Report of PCT/JP2018/043775 dated Feb. 12, 2019.
(Continued)

*Primary Examiner* — Pamela Rodriguez
(74) *Attorney, Agent, or Firm* — Mattingly & Malur, PC

(57) ABSTRACT

A piston boot has an annular fixing part that is formed on one end side of a stretchable part and abuts against an inner peripheral side of the cylinder. An outer peripheral surface of the annular fixing part is provided with a first region that abuts against an inner peripheral surface of the cylinder and a second region that is disposed closer to a bottom side of the cylinder than the first region in a piston axial direction. The outer diameter of the first region is larger than the inner diameter of the region of the inner peripheral surface of the cylinder that faces the second region.

11 Claims, 8 Drawing Sheets

(51) Int. Cl.
*F16D 65/092* (2006.01)
*F16D 65/18* (2006.01)
*F16D 55/00* (2006.01)
*F16D 125/04* (2012.01)
*F16D 125/06* (2012.01)
*F16D 125/08* (2012.01)

(52) U.S. Cl.
CPC ...... *F16D 65/18* (2013.01); *F16D 2055/0016* (2013.01); *F16D 2125/04* (2013.01); *F16D 2125/06* (2013.01); *F16D 2125/08* (2013.01)

(58) Field of Classification Search
CPC ............. F16D 2125/04; F16D 2125/06; F16D 2125/08; F16J 15/52; F16J 15/46; F16J 3/042
See application file for complete search history.

(56) References Cited

U.S. PATENT DOCUMENTS

| | | | | |
|---|---|---|---|---|
| 4,431,090 | A * | 2/1984 | Kinoshita | ............... F16D 65/18 188/264 G |
| 10,883,608 | B2 * | 1/2021 | Suzuki | .................... F16J 15/52 |
| 2014/0110906 | A1 | 4/2014 | Champion et al. | |
| 2016/0032995 | A1 | 2/2016 | Nishino et al. | |
| 2019/0353213 | A1 * | 11/2019 | Inoue | .................. F16D 55/2265 |
| 2020/0141498 | A1 | 5/2020 | Suzuki et al. | |
| 2021/0199168 | A1 * | 7/2021 | Noguchi | ............... F16D 65/183 |
| 2021/0285508 | A1 * | 9/2021 | Osada | .................... F16D 65/18 |

FOREIGN PATENT DOCUMENTS

| | | |
|---|---|---|
| DE | 2919535 A1 | 2/1980 |
| DE | 3814695 A1 | 11/1989 |
| DE | 10 2015 214 346 A1 | 2/2016 |
| EP | 2 208 917 A1 | 7/2010 |
| JP | 58-193135 U | 12/1983 |
| JP | 7-224934 A | 8/1995 |
| JP | 2009-19643 A | 1/2009 |
| JP | 2014-510244 A | 4/2014 |

OTHER PUBLICATIONS

Written Opinion of PCT/JP2018/043775 dated Feb. 12, 2019.
Indian Office Action received in corresponding Indian Application No. 202017023002 dated Apr. 5, 2021.
German Office Action received in corresponding German Application No. 11 2018 006 050.0 dated Jul. 28, 2021.

* cited by examiner

DISC BRAKE AND PISTON BOOT

TECHNICAL FIELD

The present invention relates to a disc brake and a piston boot.

Priority is claimed on Japanese Patent Application No. 2017-227825 filed on Nov. 28, 2017, the content of which is incorporated herein by reference.

BACKGROUND ART

In a disc brake, there is a case where a piston boot is provided between a piston and an opening end of a cylinder hole (for example, refer to Patent Literature 1).

CITATION LIST

Patent Literature

[Patent Literature 1]
Japanese Unexamined Patent Application, First Publication No. H7-224934

SUMMARY OF INVENTION

Technical Problem

It is desired to suppress erroneous assembling of the piston boot.

The present invention provides a disc brake and a piston boot that is capable of suppressing erroneous assembling of a piston boot.

Solution to Problem

According to a first aspect of the present invention, a disc brake includes a piston boot. The piston boot has an annular fixing part that is formed on one end side of the stretchable part and abuts against an inner peripheral side of the cylinder. An outer peripheral surface of the annular fixing part is provided with a first region that abuts against an inner peripheral surface of the cylinder, and a second region that is disposed closer to a bottom side of the cylinder than the first region in a piston axial direction. An outer diameter of the first region is larger than an inner diameter of a region of the inner peripheral surface of the cylinder that faces the second region.

According to a second aspect of the present invention, the piston boot has an annular fixing part that is formed on one end side of the stretchable part and fitted to the stepped part of the cylinder opening of the caliper. The fixing part has an outer peripheral surface that abuts against an inner peripheral surface of the stepped part, an annular facing lateral surface that abuts against an annular wall surface of the stepped part, and an opposite lateral surface that is located opposite to the facing lateral surface in a piston axial direction and on which a base end of the stretchable part is provided. An outer diameter of the outer peripheral surface on the opposite lateral surface side is larger than an outer diameter of the outer peripheral surface on the facing lateral surface side.

Advantageous Effects of Invention

According to the above-described disc brake and piston boot, it is possible to suppress the erroneous assembling of the piston boot.

DESCRIPTION OF EMBODIMENTS

First Embodiment

A first embodiment will be described below with reference to FIGS. 1 to 6.

Figure 1:
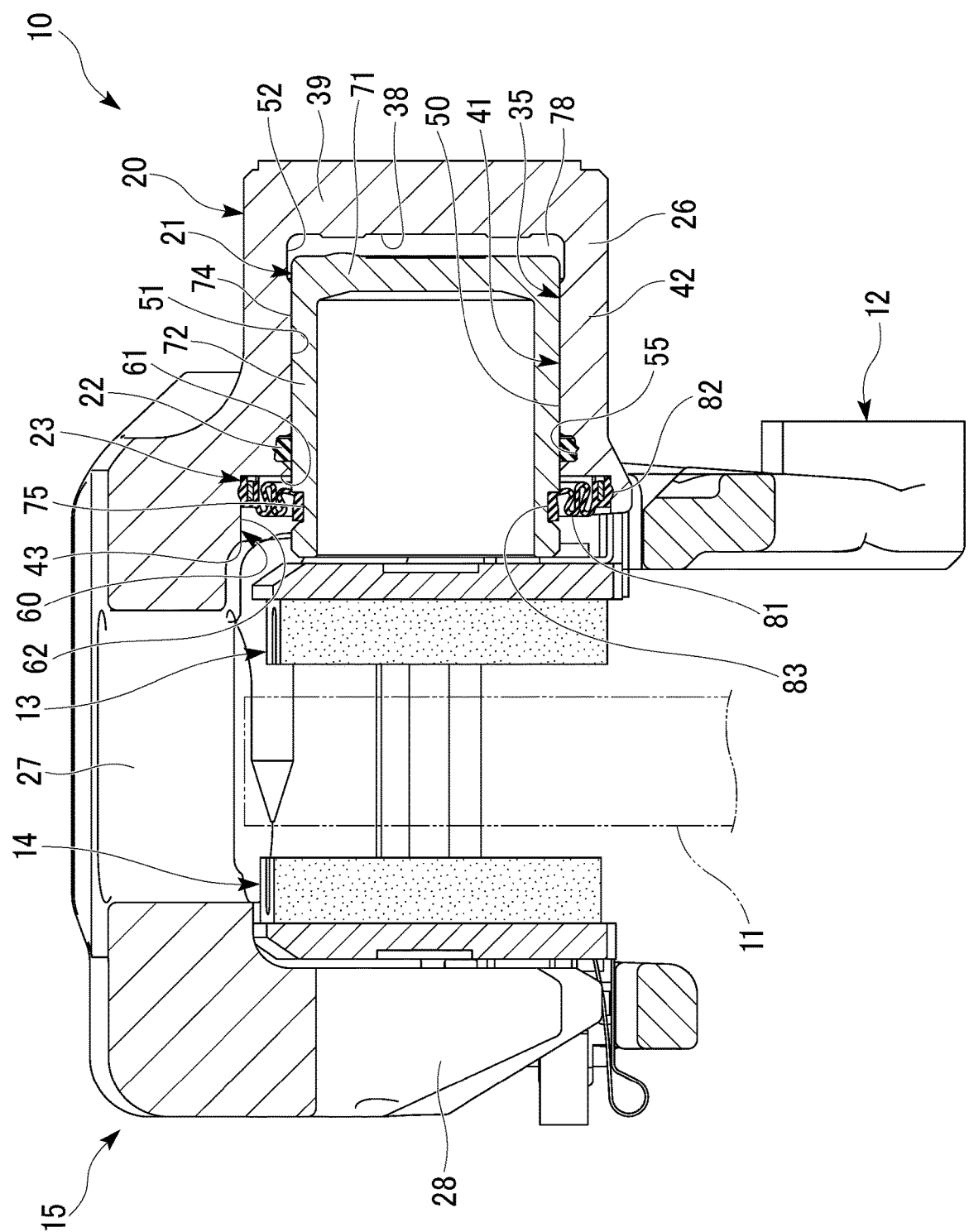
FIG. 1 is a cross-sectional view illustrating a disc brake according to a first embodiment of the present invention.
Figure 2:
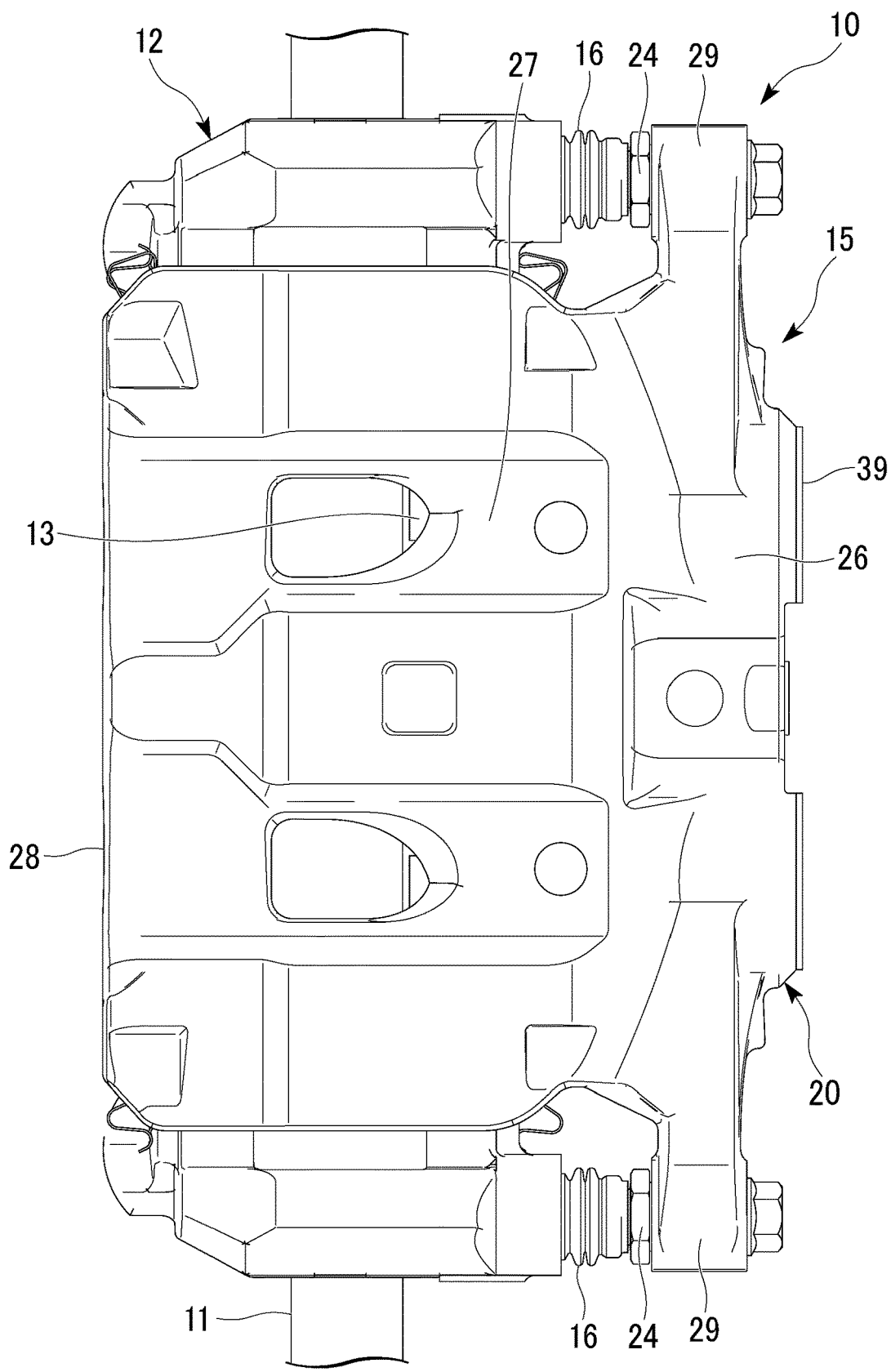
FIG. 2 is a plan view illustrating the disc brake according to the first embodiment of the present invention.

FIGS. 1 and 2 illustrate a disc brake 10 according to the first embodiment. The disc brake 10 applies a braking force to a vehicle such as an automobile, and is specifically used for braking a four-wheeled automobile. The disc brake 10 brakes the vehicle by stopping the rotation of a disc 11 that rotates together with wheels (not illustrated). Hereinafter, the direction of a center axis of the disc 11 is referred to as a disc axial direction, a radial direction of the disc 11 is referred to as a disc radial direction, and a circumferential direction (rotational direction) of the disc is referred to as a disc circumferential direction.

The disc brake 10 includes a carrier 12, a pair of pads 13, 14 illustrated in FIG. 1, a caliper 15, and a pair of pin boots 16 illustrated in FIG. 2. The carrier 12 is disposed to straddle an outer peripheral side of the disc 11 and is fixed to a non-rotating part of the vehicle. The pair of pads 13 and 14 illustrated in FIG. 1 are disposed on both sides of the disc 11 and supported on the carrier 12 so as to be movable in the disc axial direction. The pair of pads 13 and 14 faces both surfaces of the disc 11, respectively. The caliper 15 is supported on the carrier 12 so as to be movable in the disc axial direction. The caliper 15 sandwiches the pair of pads 13 and 14 and presses the pads against both surfaces of the disc 11.

The caliper 15 has a caliper body 20, a piston 21, a piston seal 22, a piston boot 23, and a pair of slide pins 24 illustrated in FIG. 2.

The caliper body 20 is formed by machining a metal material integrally molded by casting. As illustrated in FIG.

1, the caliper body 20 has a cylinder 26 disposed to face one side of the disc 11 in the disc axial direction, a bridge part 27 extending from the outside of the cylinder 26 in the disc radial direction so as to straddle an outer periphery of the disc 11, a claw part 28 extending inward in the disc radial direction from the side of the bridge part 27 opposite to the cylinder 26 and disposed to face the other side of the disc 11 in the disc axial direction, and a pair of arm parts 29 (illustrated in FIG. 2) extending from the cylinder 26 to both sides in the disc circumferential direction. The caliper body 20 is movably supported on the carrier 12 by slide pins 24 attached to the pair of arm parts 29. The pair of pin boots 16 cover portions of the slide pin 24 that come into sliding contact with the carrier 12.

As illustrated in FIG. 1, the cylinder 26 is formed with a bore 35 of which one end opens toward the claw part 28 and which is recessed toward a side opposite to the disc 11 in the disc axial direction. The cylinder 26 is provided with the bores 35 at a plurality of, specifically, two locations (only one location is illustrated in FIG. 1 because FIG. 1 shows a cross-sectional view). Those bores 35 have the same shape. The bores 35 are provided side by side in the disc circumferential direction such that the positions thereof in the disc axial direction and the disc radial direction are aligned and the positions thereof in the disc circumferential direction are shifted.

The cylinder 26 has a cylinder bottom part 39 and a cylinder barrel part 42 by forming the plurality of bores 35 opening toward the claw part 28 side. The cylinder bottom part 39 is provided on a side opposite to the claw part 28. The cylinder bottom part 39 includes inner bottoms 38 of the plurality of bores 35. The cylinder barrel part 42 extends from the cylinder bottom part 39 toward the claw part 28. The cylinder barrel part 42 includes respective inner walls 41 of the plurality of bores 35. Each bore 35 has an opening 43 on the side of the inner wall 41 opposite to the cylinder bottom part 39. The opening 43 is also an opening of the cylinder 26. The cylinder bottom part 39 side of the cylinder 26 is referred to as a cylinder bottom part side. The opening 43 side of the cylinder 26 is referred to as a cylinder opening side.

The piston 21 is fitted into each of the bores 35 so as to be slidable in the disc axial direction. An inner wall inner peripheral surface 50, which is an inner peripheral surface of the inner wall 41 of the cylinder 26, has a guide inner peripheral surface 51 that is a cylindrical surface having a constant inner diameter over the entire length and guides the movement of the piston 21. A center axis of the guide inner peripheral surface 51 is a center axis of the bore 35. The center axis is referred to as a bore axis. Additionally, a direction perpendicular to the center axis is referred to as a bore radial direction. A circumferential direction about the center axis is referred to as a bore circumferential direction.

The inner wall 41 of the bore 35 has an annular large-diameter groove 52, which is recessed further outward in the bore radial direction than the guide inner peripheral surface 51, closer the cylinder bottom part side than the guide inner peripheral surface 51. The large-diameter groove 52 has an annular shape centered on the bore axis. The groove bottom diameter of the large-diameter groove 52 is larger than the guide inner peripheral surface 51.

The inner wall 41 of the bore 35 has an annular seal groove 55, which is recessed further outward in the bore radial direction than the guide inner peripheral surface 51, at an intermediate position of the guide inner peripheral surface 51 on the cylinder opening side. The seal groove 55 is an annular groove that is centered on the bore axis and is provided on the inner wall 41 of the bore 35 so as to be recessed from the guide inner peripheral surface 51. The groove bottom diameter of the seal groove 55 is larger than the guide inner peripheral surface 51.

An annular stepped part 60, which is recessed further outward in the bore radial direction than the guide inner peripheral surface 51, is formed closer to the cylinder opening side than the seal groove 55 on the inner wall 41 of the bore 35. The stepped part 60 has an annular stepped part wall surface 61 (wall surface) and an annular stepped part inner peripheral surface 62 (inner peripheral surface of the stepped part). The stepped part wall surface 61 and the stepped part inner peripheral surface 62 configures the inner wall inner peripheral surface 50 of the inner wall 41. The stepped part wall surface 61 is formed of a flat surface that spreads radially outward perpendicularly to the bore axis from an end edge of the guide inner peripheral surface 51 on the cylinder opening side. The stepped part inner peripheral surface 62 has a substantially cylindrical surface shape extending from an outer peripheral edge of the stepped part wall surface 61 in the bore radial direction toward the cylinder opening side.

The stepped part wall surface 61 is provided on the cylinder bottom part 39 side of the cylinder 26 in the stepped part 60.

The stepped part 60, and the stepped part wall surface 61 and the stepped part inner peripheral surface 62 provided on the stepped part 60 each have an annular shape centered on the bore axis. In the stepped part 60, the inner diameter of the stepped part inner peripheral surface 62 is larger than that of the guide inner peripheral surface 51. The stepped part 60 configures an inner peripheral side of the cylinder 26. The stepped part wall surface 61 and the stepped part inner peripheral surface 62 configures a portion of the inner wall inner peripheral surface 50 of the cylinder 26. An end of the stepped part 60 opposite to the cylinder bottom part 39 is the opening 43 of the cylinder 26, that is, the bore 35. Hence, the annular stepped part 60 is formed on the opening 43 side of the bore 35.

The large-diameter groove 52 and the inner bottom 38 connected to the large-diameter groove 52 are cast when the material of the caliper body 20 is cast. The guide inner peripheral surface 51, the seal groove 55, and the stepped part 60 are formed by performing cutting work on the material of the caliper body 20.

A pipe hole (not illustrated), which penetrates in the bore axial direction, is formed in the cylinder bottom part 39 so as to open into the bore 35. The pipe hole is formed by performing cutting work on the material of the caliper body 20. A brake pipe (not illustrated) is connected to the pipe hole.

The piston 21 includes a disc-shaped piston bottom part 71 and a cylindrical piston barrel part 72. The piston 21 is formed in a bottomed tubular shape in which an end of the piston barrel part 72 opposite to the piston bottom part 71 opens. The piston barrel part 72 has an outer diameter surface 74 configured of a cylindrical surface. A center axis of the outer diameter surface 74 is a center axis of the piston 21. The center axis is referred to as a piston axis. Additionally, a direction perpendicular to the center axis is referred to as a piston radial direction. A circumferential direction about the center axis is referred to as a piston circumferential direction. An annular fitting groove 75, which is recessed further inward in the piston radial direction than the outer diameter surface 74 configured of a cylindrical surface, is formed over the entire periphery in the piston circumferential direction on a tip side of the piston barrel part 72 opposite to the piston bottom part 71 in the piston axial direction.

The piston 21 is accommodated in the bore 35 such that the piston bottom part 71 is located on the cylinder bottom part side within the bore 35. In this state, the tip of the piston 21 on the claw part 28 side protrudes further toward the claw part 28 from the bore 35. In other words, the cylinder 26 of the caliper body 20 has the bore 35 that movably accommodates the piston 21 and has one end opens to allow the piston 21 to protrude from the tip thereof. The fitting groove 75 is formed on the tip side of the piston 21 that protrudes further than the guide inner peripheral surface 51 of the bore 35.

The piston seal 22 is made of an elastic material, specifically, made of rubber. The piston seal 22 is fitted into the seal groove 55 of the bore 35 with an interference. The piston 21 is fitted to an inner peripheral side of the piston seal 22 with an interference. The piston seal 22 is elastically deformed in the radial direction so as to closely adhere to the outer diameter surface 74 of the piston 21 and the seal groove 55 to seal a gap between the bore 35 of the cylinder 26 and the piston 21. Additionally, the piston seal 22 supports the outer diameter surface 74 of the piston 21 with the guide inner peripheral surface 51 of the bore 35 so as to be movable in the bore axial direction. The piston seal 22 forms a hydraulic chamber 78 with the bore 35 and the piston 21. The supply and discharge of a brake fluid to and from the hydraulic chamber 78 are performed via the brake pipe connected to the pipe hole (not illustrated).

The piston boot 23 is a stretchable tubular body. The piston boot 23 includes a bellows-like stretchable part 81, an annular fixing part 82 formed on one end side of the stretchable part 81, and an annular fitting part 83 formed on the other end side of the stretchable part 81. In the piston boot 23, the fixing part 82 at one end is fitted and fixed to the stepped part 60 of the cylinder 26, and the fitting part 83 at the other end is fitted and fixed to the fitting groove 75 of the piston 21. In that case, the fixing part 82 abuts against both the stepped part wall surface 61 and the stepped part inner peripheral surface 62 of the stepped part 60 that configure the inner peripheral side of the cylinder 26.

The piston boot 23 covers a portion of the outer diameter surface 74 of the piston 21 that protrudes from the guide inner peripheral surface 51 closer to the piston bottom part 71 side than the fitting groove 75. The stretchable part 81 expands and contracts with the movement of the piston 21 with respect to the bore 35. In other words, the piston boot 23 is disposed between the fitting groove 75 on the tip side of the piston 21 and the stepped part 60 on the opening 43 side of the cylinder 26 and has the stretchable part 81 capable of expanding and contracting with the movement of the piston 21. Moreover, in other words, the piston boot 23 is disposed between the tip side of the piston 21 provided on the caliper 15 of the disc brake 10 and the stepped part 60 formed in the opening 43 of the cylinder 26 of the caliper 15. In the piston boot 23, the annular fixing part 82 that fits into the stepped part 60 is formed on one end side of the stretchable part 81.

In the disc brake 10, when the brake pedal (not illustrated) is operated, the brake fluid is introduced into the hydraulic chamber 78 via the brake pipe (not illustrated) coupled to the pipe hole (not illustrated). Then, brake fluid pressure acts on the piston bottom part 71 of the piston 21 in a direction away from the cylinder bottom part 39. As a result, the piston 21 advances toward the disc 11 with respect to the bore 35 and presses the pad 13 disposed between the piston 21 and the disc 11 toward the disc 11. Accordingly, the pad 13 moves and comes into contact with the disc 11. When the piston 21 advances toward the disc 11 with respect to the bore 35 in this way, the inner peripheral side of the piston seal 22 is elastically deformed so as to integrally move a contact portion of the piston seal 22 accommodated in the seal groove 55 by friction.

Additionally, the caliper body 20 slides on the pair of slide pins 24 with respect to the carrier 12 by a reaction force of the pressing force of the pad 13 against the disc 11, and the claw part 28 presses the pad 14, which is disposed between the claw part 28 and the disc 11, toward the disc 11. Accordingly, the pad 14 comes into contact with the disc 11. In this way, the caliper 15 sandwiches the pair of pads 13 and 14 with the piston 21 and the claw part 28 from both sides by the operation of the piston 21 and presses the pair of pads 13 and 14 against both surfaces of the disc 11. As a result, the caliper 15 applies a frictional resistance to the disc 11 to generate a braking force. The piston 21 presses the pads 13 and 14 on both sides against the disc 11 by the brake fluid pressure.

If the brake pedal (not illustrated) is released from this state, the hydraulic pressure of the hydraulic chamber 78 decreases, and the force, which had caused the piston seal 22 to elastically deform as described above, applied by the piston 21 to the piston seal 22 decreases. Then, the piston seal 22 returns from the deformed state due to its own elasticity. In that case, a so-called rollback, in which the piston 21 is retracted to the cylinder bottom part side by friction, is performed to form a gap between the piston 21 and the pad 13. Then, due to the vibration of the disc 11, the pads 13 and 14 and the claw part 28 move in the direction away from the disc 11 in the disc axial direction.

Figure 3:
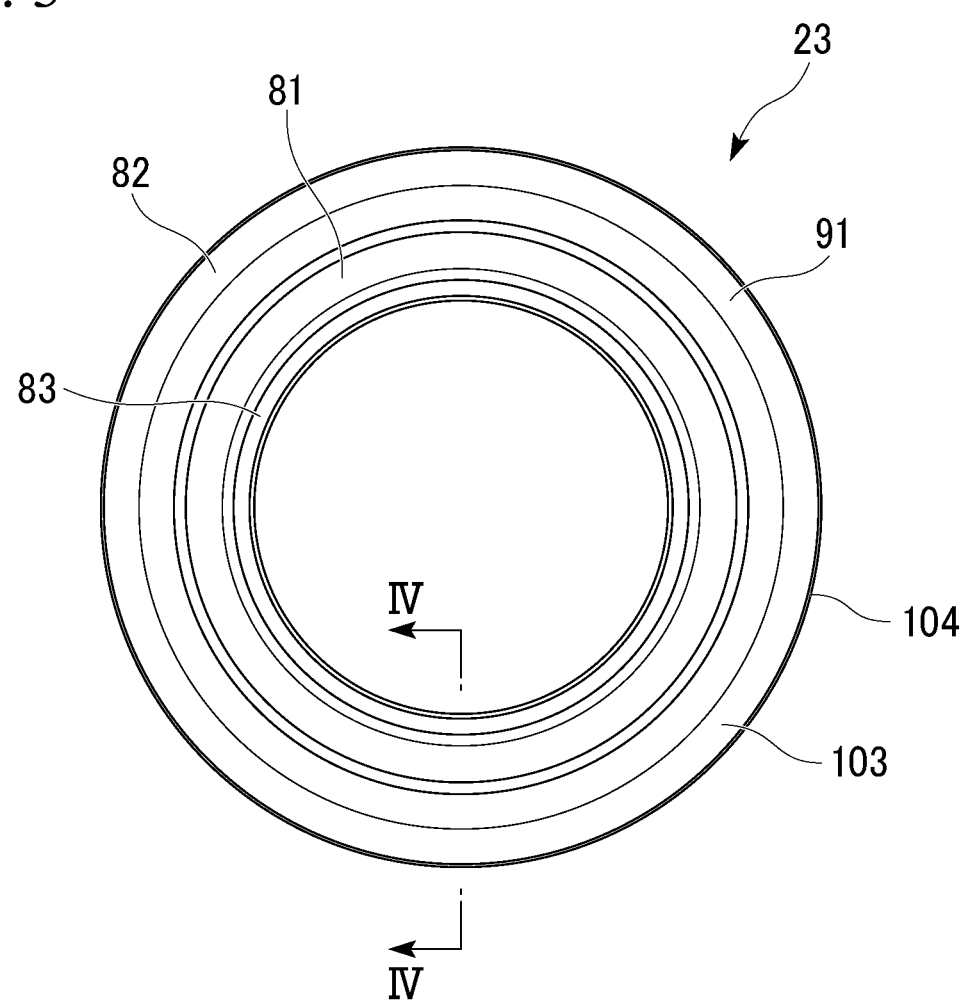
FIG. 3 is a front view illustrating a piston boot of the disc brake according to the first embodiment of the present invention.
Figure 4:
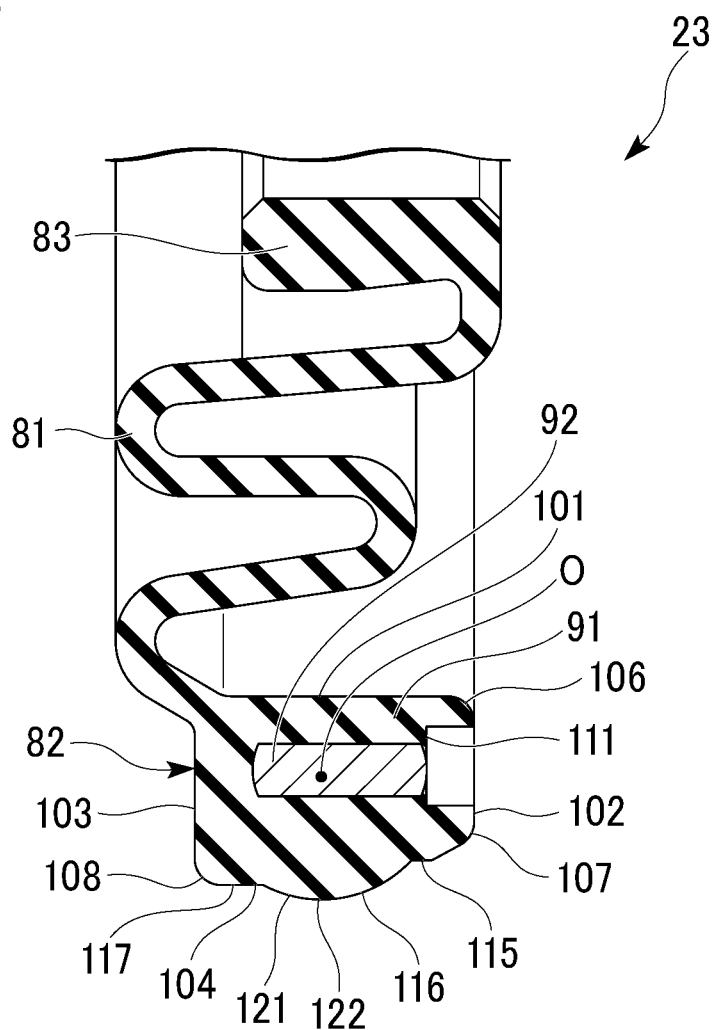
FIG. 4 is a cross-sectional view taken along line IV-IV of FIG. 3.

As illustrated in FIG. 3, the piston boot 23 is provided with the fixing part 82 so as to surround a radially outer periphery of the annular fitting part 83. The stretchable part 81 is provided between the fitting part 83 and the fixing part 82. In a state where the fitting part 83 and the fixing part 82 are coaxially disposed, as illustrated in FIG. 4, the stretchable part 81 extends from one end edge of the fitting part 83 in the axial direction. The stretchable part 81 extends from an end edge of the fixing part 82 on the opposite side in the axial direction from the extending position from the fitting part 83. In other words, the fitting part 83 and the fixing part 82 are disposed such that respective coupling positions of the stretchable part 81 are on the opposite sides in the axial direction.

The stretchable part 81 extends obliquely from one end side and the inner peripheral side in the axial direction of the fixing part 82 to one side in the axial direction and radially inward so as to be away from the fixing part 82, is folded back in the axial direction to extend obliquely to the other side in the axial direction and radially inward, is folded back in the axial direction to extend obliquely to one side in the axial direction and radially inward, and is folded back in the axial direction to extend obliquely to the other side in the axial direction and radially inward. Then, the stretchable part 81 is connected to the other end side of the fitting part 83 in the axial direction and the inner peripheral side thereof.

In the piston boot 23, the fitting part 83 and the stretchable part 81 are made of an elastic material, specifically, rubber. The fixing part 82 has an elastic part 91 made of rubber and a reinforcing part 92 made of metal. The fixing part 82 includes an inner peripheral surface 101, a back lateral surface 102 (facing lateral surface), an opening-side lateral surface 103 (opposite lateral surface), an outer peripheral surface 104, a roundly chamfered part 106, and a roundly chamfered part 107, and a roundly chamfered part 108.

The inner peripheral surface 101 is configured of a cylindrical surface. The back lateral surface 102 is configured of an annular flat surface that spreads radially outward from one side in the axial direction of the inner peripheral surface 101 so as to be perpendicular to the axial direction of the inner peripheral surface 101. The opening-side lateral surface 103 is configured of an annular flat surface that spreads radially outward from the other side in the axial direction of the inner peripheral surface 101 so as to be perpendicular to the axial direction of the inner peripheral surface 101. The outer peripheral surface 104 extends so as to connect the outer peripheral sides of the back lateral surface 102 and the opening-side lateral surface 103 to each other.

The roundly chamfered part 106 is provided between the inner peripheral surface 101 and the back lateral surface 102. The cross-sectional shape of the roundly chamfered part 106 on a plane including a center axis of the inner peripheral surface 101 is an arc shape having a center on the inner side of the fixing part 82. The roundly chamfered part 107 is provided between the outer peripheral surface 104 and the back lateral surface 102. The sectional shape of the roundly chamfered part 107 on the plane including the center axis of the inner peripheral surface 101 is an arc shape having a center on the inner side of the fixing part 82. The roundly chamfered part 108 is provided between the outer peripheral surface 104 and the opening-side lateral surface 103. The sectional shape of the roundly chamfered part 108 on the plane including the center axis of the inner peripheral surface 101 is an arc shape having a center on the inner side of the fixing part 82.

The stretchable part 81 extends from between the inner peripheral surface 101 and the opening-side lateral surface 103. Hence, in the piston boot 23, the stretchable part 81 extends from the opening-side lateral surface 103 of the fixing part 82 opposite to the back lateral surface 102. In other words, the fixing part 82 has the opening-side lateral surface 103 that is located opposite to the back lateral surface 102 in the piston axial direction and on which a base end of the stretchable part 81 is provided. The inner peripheral surface 101, the back lateral surface 102, the opening-side lateral surface 103, the outer peripheral surface 104, and the roundly chamfered parts 106 to 108 have the coinciding center axes and are all formed in the elastic part 91. The center axis of the reinforcing part 92 also coincides with these center axes. These center axes are the center axes of the fixing part 82.

The elastic part 91 of the fixing part 82 is formed with a recess 111 that is recessed in the axial direction from the back lateral surface 102. A plurality of the recess 111 are formed at equal intervals in the circumferential direction of the fixing part 82. One end surface of the reinforcing part 92 in the axial direction is disposed at the bottom position of each recess 111. The piston boot 23 is integrally molded by disposing the metal reinforcing part 92 within a mold and pouring rubber into the mold. The plurality of recesses 111 are portions formed by protrusions provided on the mold in order to support the reinforcing part 92.

The outer peripheral surface 104 includes a smaller outer diameter region 115 (second region), an enlarged outer diameter region 116 (enlarged diameter region), and a larger outer diameter region 117 (first region) in order from the back lateral surface 102 side in the axial direction.

The smaller outer diameter region 115 is configured of a cylindrical surface that extends in a direction opposite to the back lateral surface 102 from the other end edge of the roundly chamfered part 107 connected to the back lateral surface 102 on one end side. The enlarged outer diameter region 116 gradually increases in diameter as being away from the smaller outer diameter region 115 in the axial direction, and thereafter gradually decreases in diameter. The larger outer diameter region 117 is configured of a cylindrical surface that extends in a direction opposite to the smaller outer diameter region 115 from an end edge of the enlarged outer diameter region 116 opposite to the smaller outer diameter region 115.

The larger outer diameter region 117 is connected to the other end edge of the roundly chamfered part 108 connected to the opening-side lateral surface 103 on one end side. The enlarged outer diameter region 116 is located between the smaller outer diameter region 115 and the larger outer diameter region 117, and has a shape that bulges further radially outward than the smaller outer diameter region 115 and the larger outer diameter region 117.

The smaller outer diameter region 115 and the larger outer diameter region 117 are cylindrical surfaces coaxial with the inner peripheral surface 101, and the larger outer diameter region 117 has a larger diameter than the smaller outer diameter region 115. Additionally, the larger outer diameter region 117 has a longer axial length than the smaller outer diameter region 115.

In the outer peripheral surface 104, the outer diameter of the larger outer diameter region 117 on the opening-side lateral surface 103 side is larger than the outer diameter of the smaller outer diameter region 115 on the back lateral surface 102 side. Additionally, the piston boot 23 has the enlarged outer diameter region 116 having a larger outer diameter than any of the smaller outer diameter region 115 and the larger outer diameter region 117, between the smaller outer diameter region 115 and the larger outer diameter region 117. The enlarged outer diameter region 116 is a surface of an annular protrusion 121 that bulges further radially outward than the smaller outer diameter region 115 and the larger outer diameter region 117. The annular protrusion 121 is formed at an intermediate part of the outer peripheral surface 104 in the piston axial direction. The outer diameter of the annular protrusion 121 is larger than the outer diameter of the smaller outer diameter region 115 of the outer peripheral surface 104 on the back lateral surface 102 side and the outer diameter of the larger outer diameter region 117 on the opening-side lateral surface 103 side.

The enlarged outer diameter region 116 has a cross-sectional shape in a plane including the center axis of the fixing part 82 and has an arc shape having the center O closer to on the center axis of the fixing part 82 than the enlarged outer diameter region 116. The center O of the arc of the enlarged outer diameter region 116 is shifted toward the opening-side lateral surface 103 with respect to a central position between the back lateral surface 102 and the opening-side lateral surface 103. The center O of the arc causes a largest outer diameter part 122, which has the largest outer diameter of the enlarged outer diameter region 116, to coincide with the axial position of the fixing part 82. Hence, the largest outer diameter part 122 of the annular protrusion 121 is also shifted toward the opening-side lateral surface 103 side with respect to the central position between the back lateral surface 102 of the fixing part 82 and the opening-side lateral surface 103 opposite to the back lateral surface 102.

Figure 5:
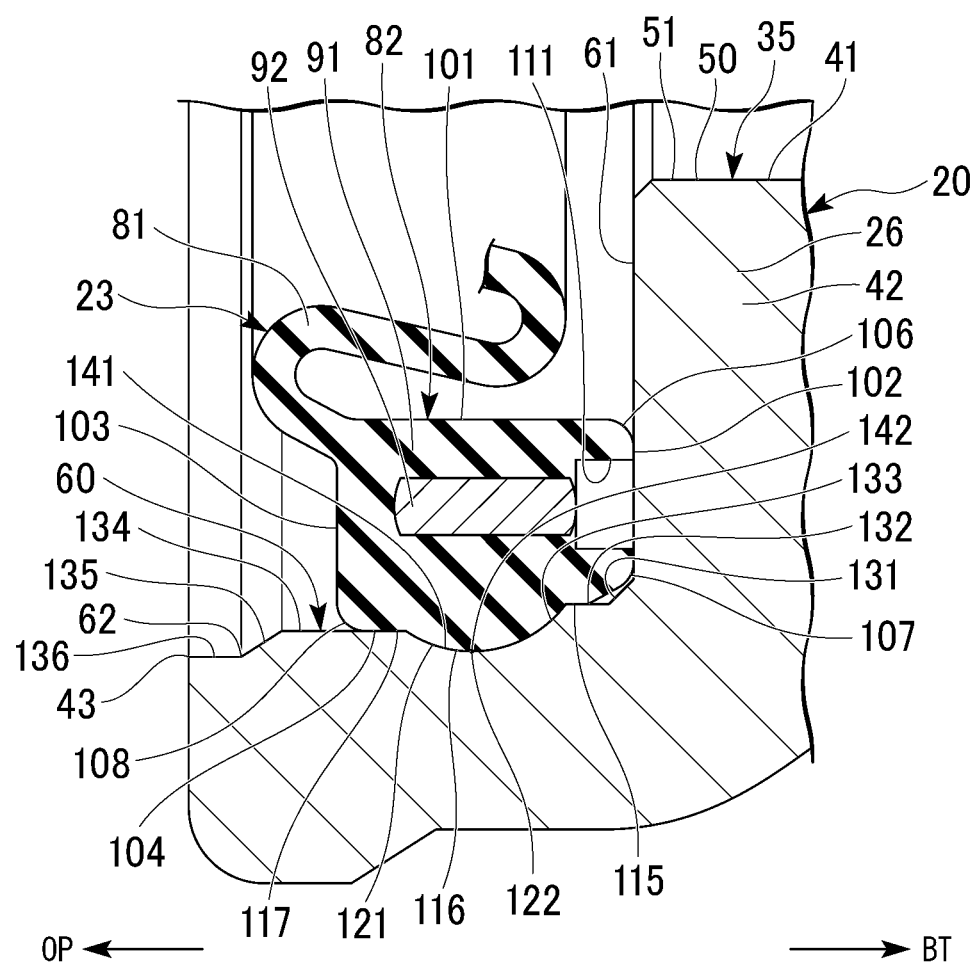
FIG. 5 is a partial cross-sectional view illustrating a normally assembled state of the piston boot of the disc brake according to the first embodiment of the present invention.

As illustrated in FIG. 5, the stepped part inner peripheral surface 62 of the stepped part 60, which configures the inner wall inner peripheral surface 50 of the cylinder 26, includes a back tapered surface 131, a smaller inner diameter region 132 (a region facing the second region, a fourth region), an enlarged inner diameter region 133, a larger inner diameter region 134 (third region), an opening-side tapered surface 135, and an opening-side region 136 in order from the stepped part wall surface 61 side.

The back tapered surface 131 is configured of a tapered surface that extends from a larger-diameter-side peripheral edge of the stepped part wall surface 61 toward the cylinder opening side such that the diameter increases toward the cylinder opening side. The smaller inner diameter region 132 is configured of a cylindrical surface that extends in a direction away from the stepped part wall surface 61 from an end edge of the back tapered surface 131 opposite to the stepped part wall surface 61. The diameter of the enlarged inner diameter region 133 gradually increases as being away from the smaller inner diameter region 132 in the axial direction, and thereafter gradually decreases. The larger inner diameter region 134 is configured of a cylindrical surface that extends in the direction opposite to the smaller inner diameter region 132 from an end edge of the enlarged inner diameter region 133 opposite to the smaller inner diameter region 132. The enlarged inner diameter region 133 is located between the smaller inner diameter region 132 and the larger inner diameter region 134 and has a shape that is recessed further radially outward than the smaller inner diameter region 132 and the larger inner diameter region 134.

The opening-side tapered surface 135 is configured of a tapered surface that extends in a direction opposite to the enlarged inner diameter region 133 from an end edge of the larger inner diameter region 134 opposite to the enlarged inner diameter region 133 so as to have a larger diameter as being closer to a side opposite to the enlarged inner diameter region 133. The opening-side region 136 is configured of a cylindrical surface that extends in a direction opposite to the larger inner diameter region 134 from an end edge of the opening-side tapered surface 135 opposite to the larger inner diameter region 134. An end of the opening-side region 136 opposite to the opening-side tapered surface 135 is an opening 43.

The smaller inner diameter region 132, the larger inner diameter region 134, and the opening-side region 136 are coaxial cylindrical surfaces. The inner diameter of the larger inner diameter region 134 is larger than that of the smaller inner diameter region 132. Additionally, the inner diameter of the opening-side region 136 is larger than that of the larger inner diameter region 134. Additionally, the axial length of the larger inner diameter region 134 is longer than that of the smaller inner diameter region 132.

Hence, in the stepped part inner peripheral surface 62, the inner diameter of the larger inner diameter region 134 opposite to the stepped part wall surface 61 is larger than the inner diameter of the smaller inner diameter region 132 on the stepped part wall surface 61 side. Additionally, the stepped part 60 has an enlarged inner diameter region 133 having a larger inner diameter than any of the smaller inner diameter region 132 and the larger inner diameter region 134, between the smaller inner diameter region 132 and the larger inner diameter region 134. The enlarged inner diameter region 133 is a surface of an annular peripheral groove 141 that is recessed further radially outward than the smaller inner diameter region 132 and the larger inner diameter region 134. The annular peripheral groove 141 is formed at an intermediate part of the stepped part inner peripheral surface 62 in the bore axial direction. The inner diameter of the peripheral groove 141 is larger than the inner diameter of the smaller inner diameter region 132 and the inner diameter of the larger inner diameter region 134 on both sides in the bore axial direction. In other words, the inner wall inner peripheral surface 50 of the cylinder 26 has the peripheral groove 141 having a larger inner diameter than any of the smaller inner diameter region 132 and the larger inner diameter region 134, between the smaller inner diameter region 132 and the larger inner diameter region 134.

The cross-sectional shape of the enlarged inner diameter region 133 in a plane including the bore axis is an arc shape having a center closer to the bore axis side in the bore radial direction than the enlarged inner diameter region 133. The arc has the same diameter as the arc of the cross-section of the enlarged outer diameter region 116 in the plane including the center axis of the fixing part 82. The center of the arc of the enlarged inner diameter region 133 causes a largest inner diameter part 142, which has the largest inner diameter of the enlarged inner diameter region 133, to coincide with the position of the bore axis.

The fixing part 82 of the piston boot 23 is fitted to the stepped part 60 of the cylinder 26 when the piston boot 23 is assembled to the cylinder 26. In that case, the back lateral surface 102 of the fixing part 82 abuts against the stepped part wall surface 61, and the outer peripheral surface 104 of the fixing part 82 abuts against the stepped part inner peripheral surface 62 of the stepped part 60. Specifically, the smaller outer diameter region 115 faces and abuts against the smaller inner diameter region 132 in the bore radial direction such that the positions thereof in the bore axial direction overlaps with each other. The larger outer diameter region 117 faces and abuts against the larger inner diameter region 134 in the bore radial direction such that the positions thereof in the bore axial direction overlap with each other. Additionally, the annular protrusion 121 including the enlarged outer diameter region 116 fits into the peripheral groove 141 formed on the inner peripheral side of the cylinder 26. In that case, the enlarged outer diameter region 116 faces and abuts in the bore radial direction overlaps with the enlarged inner diameter region 133 such that the positions thereof in the bore axial direction overlap with each other. In other words, the enlarged outer diameter region 116 fits into the peripheral groove 141 formed in the stepped part inner peripheral surface 62 of the stepped part 60.

Here, in the fixing part 82 before being mounted on the stepped part 60, the outer diameter of the smaller outer diameter region 115 is slightly larger than the inner diameter of the smaller inner diameter region 132 by an interference, the outer diameter of the largest outer diameter part 122 of the enlarged outer diameter region 116 is also slightly larger than the inner diameter of the largest inner diameter part 142 of the enlarged inner diameter region 133 by an interference, and the outer diameter of the larger outer diameter region 117 is slightly larger than the inner diameter of the larger inner diameter region 134 by an interference.

In the annular fixing part 82 appropriately mounted on the stepped part 60, the larger outer diameter region 117 of the outer peripheral surface 104 abuts against the inner wall inner peripheral surface 50 of the cylinder 26, and the smaller outer diameter region 115 is disposed closer to the cylinder bottom part 39 side of the cylinder 26 than the larger outer diameter region 117 in the piston axial direction. The outer diameter of the larger outer diameter region 117 is larger than the inner diameter of the smaller inner diameter region 132 in the inner wall inner peripheral surface 50 of the cylinder 26, which faces the smaller outer diameter region 115 in the bore radial direction such that the positions thereof in the bore axial direction overlaps with each other. Additionally, the outer diameter of the largest outer diameter part 122 of the enlarged outer diameter region 116 is larger than the inner diameters of the smaller inner diameter region 132 and the larger inner diameter region 134.

In the piston boot 23 in a state where the fixing part 82 is appropriately mounted on the stepped part 60, the opening-side lateral surface 103 is disposed closest to the opening 43 side of the cylinder 26 in the fixing part 82. Hence, the stretchable part 81 is coupled to the fixing part 82 on the opening 43 side of the cylinder 26.

Additionally, in the annular stepped part 60 in a state where the fixing part 82 of the piston boot 23 is appropriately disposed, the outer peripheral surface 104 of the fixing part 82 is made to abut against the stepped part inner peripheral surface 62, and one annular back lateral surface 102 of the fixing part 82 is made to face the stepped part wall surface 61. When the fixing part 82 is appropriately disposed on the stepped part 60 and the back lateral surface 102 abuts against the stepped part wall surface 61, the smaller outer diameter region 115 of the fixing part 82 abuts against the smaller inner diameter region 132 of the stepped part inner peripheral surface 62 of the stepped part 60.

When the fixing part 82 of the piston boot 23 is assembled to the cylinder 26, an operator or an automatic machine inserts the fixing part 82 into the stepped part 60 in order of the roundly chamfered part 107, the smaller outer diameter region 115, the enlarged outer diameter region 116, the larger outer diameter region 117, and the roundly chamfered part 108. Then, first, the enlarged outer diameter region 116 abuts against the opening-side tapered surface 135. The operator or the automatic machine pushes the fixing part 82 from this state to elastically deform the annular protrusion 121 including the enlarged outer diameter region 116 to pass the protrusion 121 through the larger inner diameter region 134 from the opening-side tapered surface 135. When the fixing part 82 is pushed in until the back lateral surface 102 abuts against the stepped part wall surface 61, almost simultaneously when the back lateral surface 102 abuts against the stepped part wall surface 61, the insertion position of the annular protrusion 121 including the enlarged outer diameter region 116 is aligned with the enlarged inner diameter region 133, and the enlarged outer diameter region 116 returns from the elastic deformation and fits into the peripheral groove 141 including the enlarged inner diameter region 133.

Accordingly, an operational feeling in which a pushing force that has been once heavier is reduced and further pushing is restricted is generated in the operator. The operator recognizes the appropriate mounting of the fixing part 82 to the cylinder 26 from this operational feeling. Additionally, the opening-side lateral surface 103 of the fixing part 82 on the opening 43 side enters an axially intermediate position of the larger inner diameter region 134 of the stepped part inner peripheral surface 62. Moreover, the stretchable part 81 is coupled to the fixing part 82 on the opening 43 side of the cylinder 26. In addition, the larger outer diameter region 117 of the fixing part 82 abuts against the stepped part inner peripheral surface 62 of the cylinder 26, and no radial gap is formed therebetween. Such a state is an external appearance in a state where the fixing part 82 is appropriately mounted on the cylinder 26. The operator can visually check the external appearance states to confirm that the fixing part 82 is appropriately mounted on the cylinder 26. Additionally, in the case of the assembling by the automatic machine, the automatic machine can detect that a relationship between the stroke and the load when the fixing part 82 is pushed into the cylinder 26 is appropriate, or can detect any one of the above external appearance states to confirm that the fixing part 82 is appropriately mounted on the cylinder 26.

In the disc brake described in the above-described Patent Document 1, the piston boot is provided between the piston and the opening end of the cylinder hole. In a case where the piston boot is assembled to the cylinder, the operator pushes and fits the piston boot into the opening end of the cylinder hole. In that case, there is a possibility that erroneous assembling may occur in which attachment is performed with front and back reversed.

In contrast, in the piston boot 23 and the disc brake 10 having the same according to the first embodiment, the outer peripheral surface 104 of the annular fixing part 82 abutting against the inner peripheral side of the cylinder 26 has the larger outer diameter region 117 abutting against the stepped part inner peripheral surface 62 of the inner wall inner peripheral surface 50 of the cylinder 26, and the smaller outer diameter region 115 disposed closer to the cylinder bottom part 39 side than the larger outer diameter region 117 in the piston axial direction. The outer diameter of the larger outer diameter region 117 is larger than the inner diameter of the smaller inner diameter region 132 in the stepped part inner peripheral surface 62 of the cylinder 26, which faces the smaller outer diameter region 115. Additionally, in the inner wall inner peripheral surface 50 of the cylinder 26, the inner diameter of the larger inner diameter region 134 that abuts against the larger outer diameter region 117 is larger than the inner diameter of the smaller inner diameter region 132 that abuts against the smaller outer diameter region 115. Additionally, in the outer peripheral surface 104 of the fixing part 82 in the piston boot 23, the outer diameter of the larger outer diameter region 117 on the opening-side lateral surface 103 side is larger than the outer diameter of the smaller outer diameter region 115 on the back lateral surface 102 side.

Figure 6:
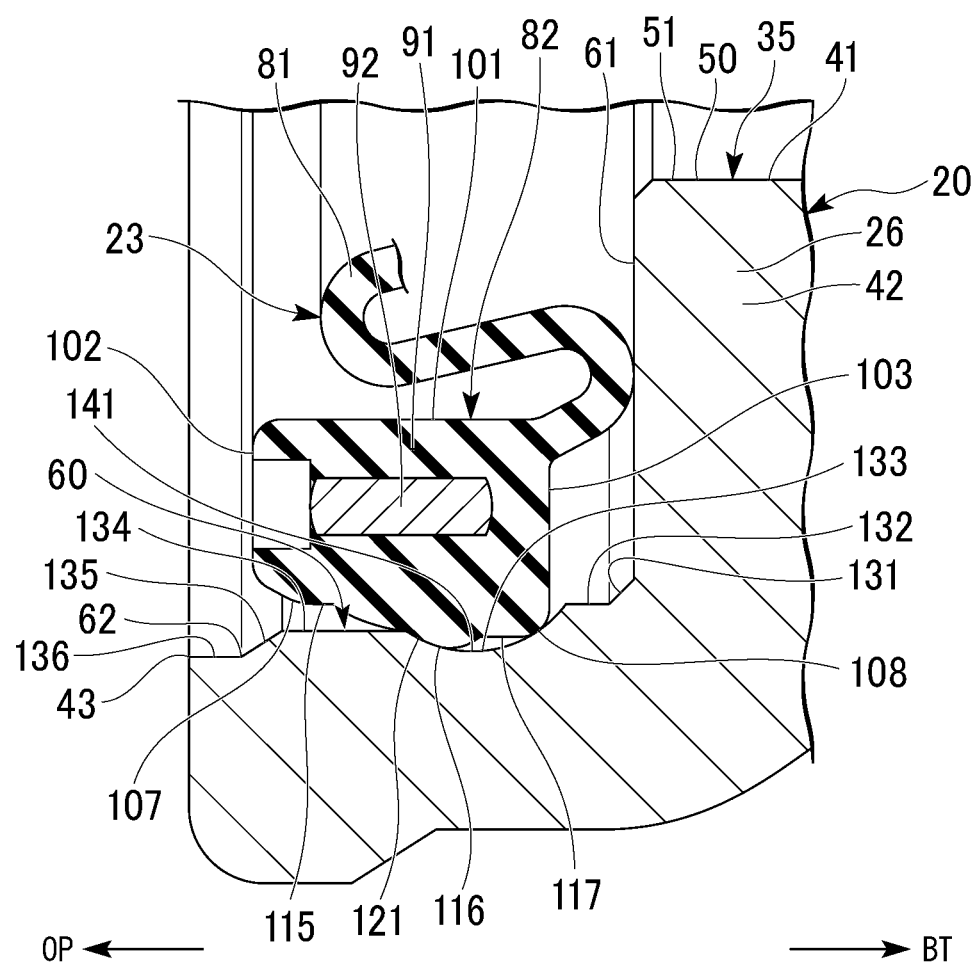
FIG. 6 is a partial cross-sectional view illustrating an erroneously assembled state of the piston boot of the disc brake according to the first embodiment of the present invention.

Accordingly, if the piston boot 23 is mounted on the cylinder 26 with front and back reversed, in the fixing part 82, as illustrated in FIG. 6, the larger outer diameter region 117 having a larger outer diameter than the inner diameter of the smaller inner diameter region 132 of the cylinder 26 cannot be fitted to the smaller inner diameter region 132. For example, the roundly chamfered part 108 of the fixing part 82 abuts against the enlarged inner diameter region 133, and further pushing is restricted. In that case, the opening-side lateral surface 103 of the fixing part 82 that faces the stepped part wall surface 61 does not abut against the stepped part wall surface 61. Additionally, the back lateral surface 102 of the fixing part 82 on the opening 43 side does not enter the axially intermediate position of the larger inner diameter region 134 of the stepped part inner peripheral surface 62 and stops at a position closer to the opening 43 than the larger inner diameter region 134. In addition, the smaller outer diameter region 115 of the fixing part 82 is separated in the radial direction from the stepped part inner peripheral surface 62 of the cylinder 26, and a radial gap is formed therebetween.

From the external appearance states, the operator can recognize that the mounting of the fixing part 82 to the cylinder 26 is not appropriate. Additionally, in the case of the assembling by the automatic machine, the automatic machine can detect that an abnormality has occurred in the relationship between the stroke and the load when the fixing part 82 is pushed into the cylinder 26, or can detect any one of the above external appearance abnormalities to detect an inappropriate mounting to generate an alarm or the like.

Therefore, erroneous assembling in which the piston boot 23 is attached to the cylinder 26 with front and back reversed can be suppressed.

Additionally, the piston boot 23 has the enlarged outer diameter region 116 having a larger outer diameter than any of the larger outer diameter region 117 and the smaller outer diameter region 115, between the larger outer diameter region 117 and the smaller outer diameter region 115. The enlarged diameter region 116 fits into the peripheral groove 141 formed on the inner peripheral side of the cylinder 26. In other words, the piston boot 23 has the enlarged outer diameter region 116 having a larger outer diameter than any of the larger outer diameter region 117 and the smaller outer diameter region 115, between the larger outer diameter region 117 and the smaller outer diameter region 115, and the inner wall inner peripheral surface 50 of the cylinder 26 has the peripheral groove 141 having a larger inner diameter than any of the larger inner diameter region 134 and the smaller inner diameter region 132, between the larger inner diameter region 134 and the smaller inner diameter region 132. Moreover, in other words, in the piston boot 23, the outer diameter of the protrusion 121 having the enlarged outer diameter region 116 is larger than the outer diameter of the smaller outer diameter region 115 on the back lateral surface 102 side and the outer diameter of the larger outer diameter region 117 on the opening-side lateral surface 103 side.

For this reason, if the piston boot 23 is mounted on the cylinder 26 with front and back reversed, the fixing part 82 stops with a gap between the fixing part 82 and the stepped part wall surface 61. Hence, the enlarged diameter region 116 cannot be appropriately fitted into the peripheral groove 141, and the operator cannot obtain the above-described operational feeling at the time of appropriate mounting. From this operational feeling, the operator can recognize that the mounting is not appropriate. Therefore, erroneous assembling in which the piston boot 23 is attached to the cylinder 26 with front and back reversed can be suppressed.

In the piston boot 23, the stretchable part 81 is coupled to the fixing part 82 on the opening 43 side of the cylinder 26. For this reason, if the piston boot 23 is mounted on the cylinder 26 with front and back reversed, the stretchable part 81 is not coupled to the fixing part 82 on the opening 43 side. The operator can also recognize that the mounting is not appropriate also based on the external appearance states. Therefore, erroneous assembling in which the piston boot 23 is attached to the cylinder 26 with front and back reversed can be suppressed.

In addition, in the piston boot 23, when the fixing part 82 is disposed on the stepped part 60 and the back lateral surface 102 abuts against the stepped part wall surface 61, the smaller outer diameter region 115 of the fixing part 82 abuts on the smaller inner diameter region 132 of the stepped part inner peripheral surface 62 of the stepped part 60. For this reason, the fixing part 82 can be caused to abut against the stepped part inner peripheral surface 62 within a long range in the bore axial direction, and the posture thereof can be stabilized.

Additionally, in the piston boot 23, the largest outer diameter part 122 of the enlarged outer diameter region 116 of the fixing part 82 is shifted from the central position between the back lateral surface 102 and the opening-side lateral surface 103. For this reason, unless the fixing part 82 is appropriately fitted to the cylinder 26, the enlarged outer diameter region 116 of the fixing part 82 cannot be appropriately fitted to the peripheral groove 141 of the cylinder 26. This also allows the operator to recognize that the mounting is not appropriate. Therefore, erroneous assembling in which the piston boot 23 is attached to the cylinder 26 with front and back reversed can be suppressed.

In addition, in the fixing part 82 of the piston boot 23, even if the outer diameter of the larger outer diameter region 117 is not configured to be larger than the inner diameter of the smaller inner diameter region 132 of the cylinder 26, as long as the largest outer diameter part 122 of the enlarged outer diameter region 116 of the fixing part 82 is shifted from the central position between the back lateral surface 102 and the opening-side lateral surface 103, it is possible to suppress erroneous assembling in which the piston boot 23 is attached to the cylinder 26 with front and back reversed.

Second Embodiment

Next, a second embodiment will be described mainly with reference to FIGS. 7 and 8, focusing on the differences from the first embodiment. In addition, parts common to those of the first embodiment will be denoted by the same names and the same reference numerals.

In the second embodiment, a portion of the fixing part 82 of the piston boot 23 and a portion of the stepped part 60 of the cylinder 26 are different from those of the first embodiment.

Figure 7:
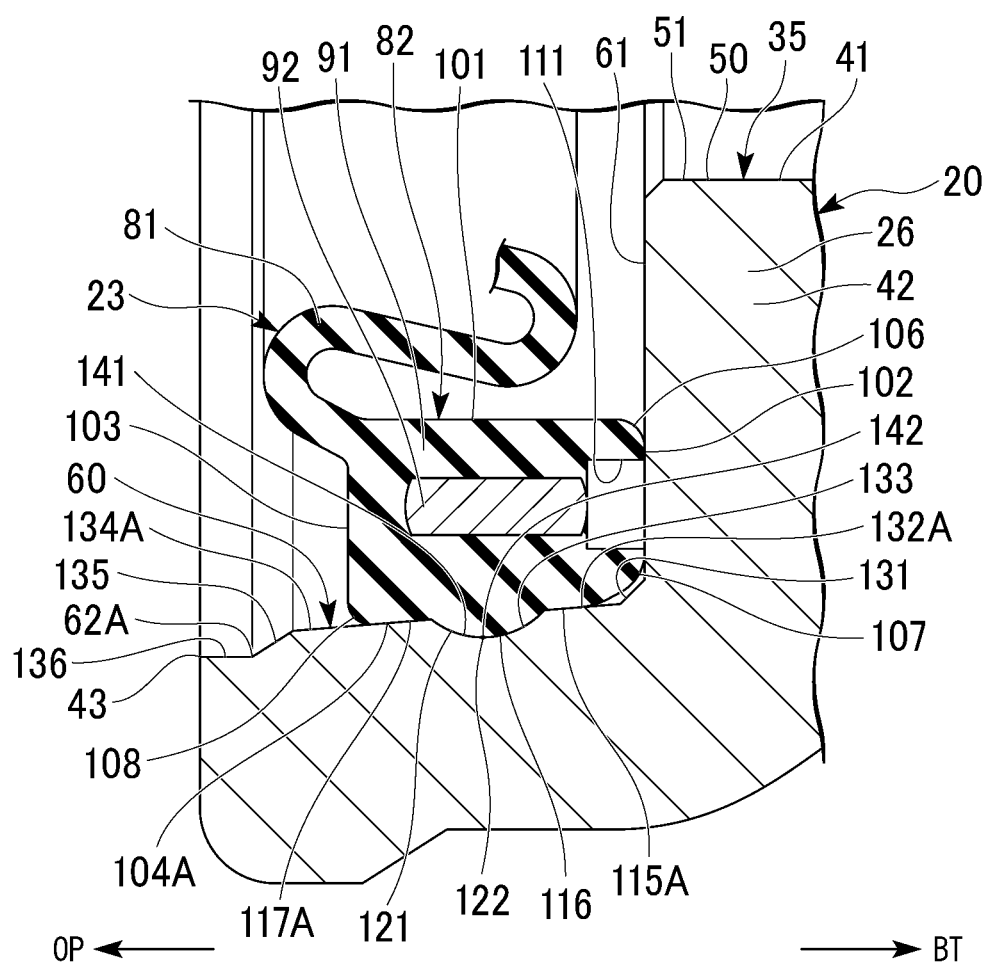
FIG. 7 is a partial cross-sectional view illustrating a normally assembled state of a piston boot of a disc brake according to a second embodiment of the present invention.

As illustrated in FIG. 7, the fixing part 82 of the piston boot 23 of the second embodiment is different from that of the first embodiment in terms of an outer peripheral surface 104A. The outer peripheral surface 104A includes a smaller outer diameter region 115A (second region), the enlarged outer diameter region 116 which is same as that of the first embodiment, and a larger outer diameter region 117A (first region) in order from the back lateral surface 102 side in the axial direction.

The smaller outer diameter region 115A is configured of a tapered surface that extends in the direction opposite to the back lateral surface 102 from an end edge of the roundly chamfered part 107 opposite to the back lateral surface 102 so as to have a larger diameter as being away from the back lateral surface 102. The larger outer diameter region 117A is configured of a tapered surface that extends in the direction opposite to the smaller outer diameter region 115A from an end edge of the enlarged outer diameter region 116 opposite to the smaller outer diameter region 115A so as to have a larger diameter as being away from the smaller outer diameter region 115A. The larger outer diameter region 117A is connected to an end edge of the roundly chamfered part 108 opposite to the opening-side lateral surface 103. The enlarged outer diameter region 116 is located between the smaller outer diameter region 115A and the larger outer diameter region 117A, and has a shape that bulges further radially outward than the smaller outer diameter region 115A and the larger outer diameter region 117A.

The smaller outer diameter region 115A and the larger outer diameter region 117A are tapered surfaces coaxial with the inner peripheral surface 101, and are disposed on the same tapered surface. Hence, the outer diameter of the larger outer diameter region 117A is larger than that of the smaller outer diameter region 115A in its entirety. Additionally, the axial length of the larger outer diameter region 117A is longer than that of the smaller outer diameter region 115A. The enlarged outer diameter region 116 is the surface of the annular protrusion 121 that has a larger outer diameter than any of the smaller outer diameter region 115A and the larger outer diameter region 117A and bulges further radially outward than the smaller outer diameter region 115A and the larger outer diameter region 117A.

The stepped part inner peripheral surface 62A of the stepped part 60 of the second embodiment includes the back tapered surface 131 which is same as that of the first embodiment, a smaller inner diameter region 132A (a region facing the second region, a fourth region), the enlarged inner diameter region 133 which is same as that of the first embodiment, a larger inner diameter region 134A (third region), the opening-side tapered surface 135 which is same as that of the first embodiment, and the opening-side region 136 which is same as that of the first embodiment, in order from the stepped part wall surface 61.

The smaller inner diameter region 132A is configured of a tapered surface that extends in the direction away from the stepped part wall surface 61 from an end edge of the back tapered surface 131 opposite to the stepped part wall surface 61 so as to have a larger diameter as being away from the stepped part wall surface 61. The larger inner diameter region 134A is configured of the tapered surface that extends in a direction opposite to the smaller inner diameter region 132A from an end edge of the enlarged inner diameter region 133 opposite to the smaller inner diameter region 132A so as to have a larger diameter as being away from the smaller inner diameter region 132A. The enlarged inner diameter region 133 is located between the smaller inner diameter region 132A and the larger inner diameter region 134A, and has a shape that is recessed further radially outwardly than the smaller inner diameter region 132A and the larger inner diameter region 134A.

The smaller inner diameter region 132A and the larger inner diameter region 134A are disposed on the same tapered surface. The inner diameter of the larger inner diameter region 134A is larger than that of the smaller inner diameter region 132A in its entirety. The tapers of the smaller inner diameter region 132A and the larger inner diameter region 134A are equal to the tapers of the smaller outer diameter region 115A and the larger outer diameter region 117A. Additionally, the larger inner diameter region 134A has a longer axial length than the smaller inner diameter region 132A. The enlarged inner diameter region 133 is the surface of the annular peripheral groove 141 that has a larger inner diameter than that of any of the smaller inner diameter region 132A and the larger inner diameter region 134A and is recessed further radially outward than the smaller inner diameter region 132A and the larger inner diameter region 134A.

The fixing part 82 of the piston boot 23 of the second embodiment is also fitted to the stepped part 60 of the cylinder 26 when the piston boot 23 is assembled to the cylinder 26. In that case, the back lateral surface 102 of the fixing part 82 abuts against the stepped part wall surface 61, and the outer peripheral surface 104A of the fixing part 82 abuts against the stepped part inner peripheral surface 62A of the stepped part 60. Specifically, in the outer peripheral surface 104A, the smaller outer diameter region 115A faces and abuts against the smaller inner diameter region 132A in the bore radial direction such that the positions thereof in the bore axial direction overlap with each other, and the larger outer diameter region 117A faces and abuts against the larger inner diameter region 134A in the bore radial direction such that the positions thereof in the bore axial direction overlap with each other. Additionally, as in the same manner with the first embodiment, the annular protrusion 121 including the enlarged outer diameter region 116 is fitted into the peripheral groove 141 formed on the inner peripheral side of the cylinder 26.

In the fixing part 82 before being mounted on the stepped part 60, the largest outer diameter of the smaller outer diameter region 115A is slightly larger than the largest inner diameter of the smaller inner diameter region 132A by an interference, and the smallest outer diameter of the larger outer diameter region 117A is slightly larger than the smallest inner diameter of the larger inner diameter region 134A by an interference.

In the annular fixing part 82 appropriately mounted on the stepped part 60, the larger outer diameter region 117A of the outer peripheral surface 104A abuts against the inner wall inner peripheral surface 50 of the cylinder 26, and the smaller outer diameter region 115A is disposed closer to the cylinder bottom part 39 side of the cylinder 26 than the larger outer diameter region 117A in the piston axial direction. Also, the smallest outer diameter of the larger outer diameter region 117A is larger than the largest inner diameter of the smaller inner diameter region 132A in the inner wall inner peripheral surface 50 of the cylinder 26, which faces the smaller outer diameter region 115A in the bore radial direction such that the positions thereof in the bore axial direction overlaps with each other. Additionally, the outer diameter of the largest outer diameter part 122 of the enlarged outer diameter region 116 is larger than the largest inner diameter of the smaller inner diameter region 132A and the smallest inner diameter of the larger inner diameter region 134A.

Additionally, in the annular stepped part 60 in a state where the fixing part 82 of the piston boot 23 is appropriately disposed, the outer peripheral surface 104A of the fixing part 82 is made to abut against the stepped part inner peripheral surface 62A, and one annular back lateral surface 102 of the fixing part 82 is made to face the stepped part wall surface 61. When the fixing part 82 is appropriately disposed on the stepped part 60 and the back lateral surface 102 abuts against the stepped part wall surface 61, the smaller outer diameter region 115A of the fixing part 82 abuts against the smaller inner diameter region 132A of the stepped part inner peripheral surface 62A of the stepped part 60.

In the second embodiment, when the fixing part 82 of the piston boot 23 is assembled to the cylinder 26, the operator inserts the fixing part 82 into the stepped part 60 in order of the roundly chamfered part 107, the smaller outer diameter region 115A, the enlarged outer diameter region 116, the larger outer diameter region 117A, and the roundly chamfered part 108. Then, first, the enlarged outer diameter region 116 abuts against the opening-side tapered surface 135. The operator pushes the fixing part 82 from this state to elastically deform the enlarged outer diameter region 116 to pass the enlarged outer diameter region 116 through the larger inner diameter region 134A from the opening-side tapered surface 135. When the fixing part 82 is pushed in until the back lateral surface 102 abuts against the stepped part wall surface 61, almost simultaneously when the back lateral surface 102 abuts against the stepped part wall surface 61, the insertion position of the enlarged outer diameter region 116 is aligned with the enlarged inner diameter region 133, and the enlarged outer diameter region 116 returns from the elastic deformation and fits into the enlarged inner diameter region 133.

Accordingly, an operational feeling in which a pushing force that has been once heavier is reduced and further insertion is restricted is generated in the operator. The operator recognizes the appropriate mounting of the fixing part 82 to the cylinder 26 from this operational feeling. Additionally, the opening-side lateral surface 103 of the fixing part 82 on the opening 43 side enters to an axially intermediate position of the larger inner diameter region 134A of the stepped part inner peripheral surface 62A.

Moreover, the stretchable part 81 is coupled to the fixing part 82 on the opening 43 side of the cylinder 26. In addition, the larger outer diameter region 117A of the fixing part 82 abuts against the stepped part inner peripheral surface 62A of the cylinder 26, and no radial gap is formed therebetween. In the second embodiment, such a state is an external appearance in which the fixing part 82 is appropriately mounted on the cylinder 26.

Figure 8:
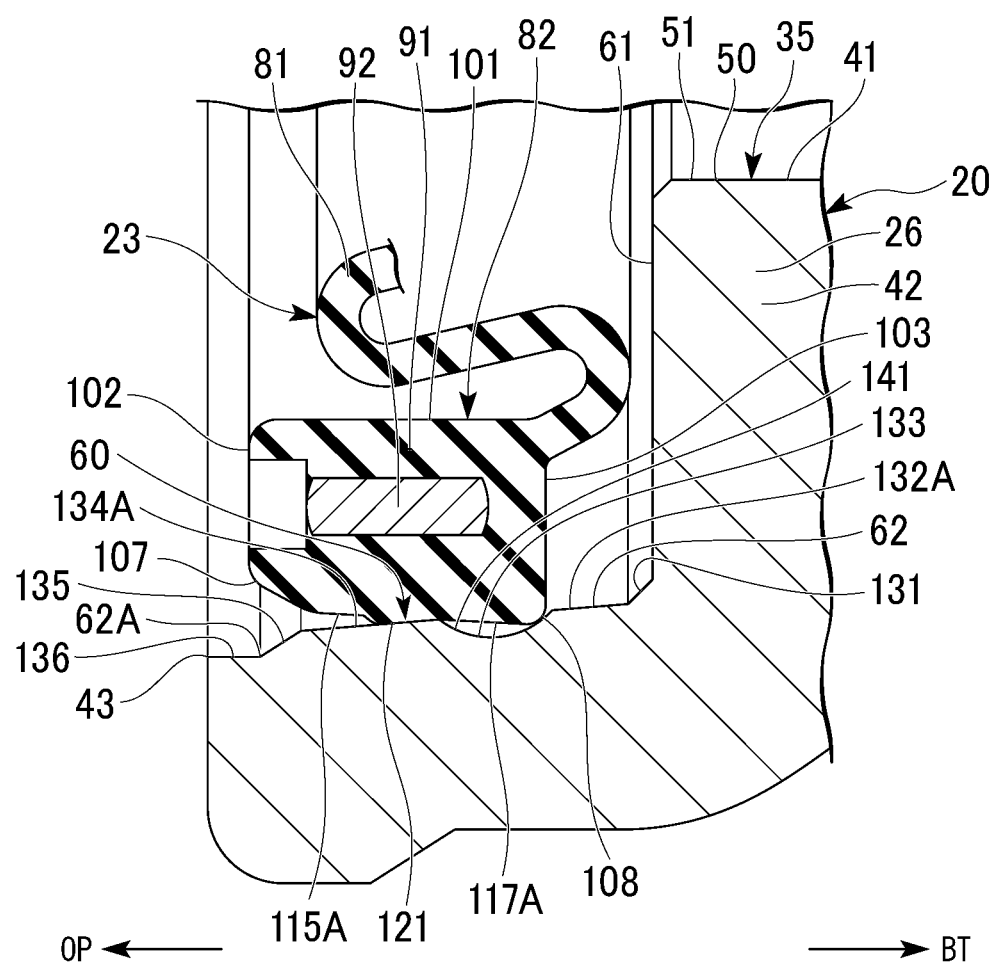
FIG. 8 is a partial cross-sectional view illustrating an erroneously assembled state of the piston boot of the disc brake according to the second embodiment of the present invention.

In contrast, if the piston boot 23 is mounted on the cylinder 26 with front and back reversed, in the fixing part 82, as illustrated in FIG. 8, the larger outer diameter region 117A having a larger outer diameter than the inner diameter of the smaller inner diameter region 132A of the cylinder 26 cannot be fitted to the smaller inner diameter region 132A. For this reason, for example, the roundly chamfered part 108 of the fixing part 82 abuts against the enlarged inner diameter region 133, and further pushing is restricted. In that case, the opening-side lateral surface 103 of the fixing part 82 that faces the stepped part wall surface 61 does not abut against the stepped part wall surface 61. Additionally, the back lateral surface 102 of the fixing part 82 on the opening 43 side does not enter to the axially intermediate position of the larger inner diameter region 134A and stops closer to the opening 43 side than the larger inner diameter region 134A. In addition, the smaller outer diameter region 115A of the fixing part 82 is separated in the radial direction from the stepped part inner peripheral surface 62A of the cylinder 26, and a radial gap is formed therebetween. The operator can also recognize that the mounting is not appropriate also from the external appearance states.

Here, since the disc brake 10 of the embodiment is of a floating type in which the caliper body 20 is movable in the disc axial direction with respect to the disc 11, the piston 21 disposed on one side of the disc 11 acts to press the pads 13 and 14 on both sides against the disc 11. In contrast, in the case of a fixed type caliper in which the caliper body is not movable in the disc axial direction with respect to the disc rotor, the piston presses only a pad on one side between the piston and the disc rotor. The shapes of the above-described stepped part 60 and fixing part 82 can be applied to such a fixed type caliper. That is, the shapes of the above-described stepped part 60 and fixing part 82 can be applied to a disc brake having a piston that presses at least one of a pair of pads.

According to a first aspect of the embodiments described above, a disc brake includes a piston that presses at least one of a pair of pads facing each other against both surfaces of a disc; a cylinder that accommodates the piston to be movable and has a bore of which one end opens so that a tip of the piston protrudes; and a piston boot that is disposed between a tip side of the piston and the cylinder and has a stretchable part capable of expanding and contracting with the movement of the piston. The piston boot has an annular fixing part that is formed on one end side of the stretchable part and abuts against an inner peripheral of the cylinder. An outer peripheral surface of the annular fixing part is provided with a first region that abuts against an inner peripheral surface of the cylinder, and a second region that is disposed closer to a bottom side of the cylinder than the first region in a piston axial direction. An outer diameter of the first region is larger than an inner diameter of a region of the inner peripheral surface of the cylinder that faces the second region. Accordingly, it is possible to suppress erroneous assembling of the piston boot.

According to a second aspect, in the first aspect, the piston boot has an enlarged diameter region having a larger outer diameter than any of the first region and the second region between the first region and the second region, and the enlarged diameter region fits into a peripheral groove formed on the inner peripheral of the cylinder.

According to a third aspect, in the first or second aspect, in the piston boot, the stretchable part is coupled to the fixing part on an opening side of the cylinder.

According to a fourth aspect, in the first aspect, an annular stepped part on which the fixing part is disposed is formed on an opening side of the bore. The stepped part has an inner peripheral surface against which the outer peripheral surface of the fixing part abuts, and an annular wall surface that faces one annular facing lateral surface of the fixing part and is located on the bottom side of the cylinder. The second region of the fixing part abuts against the inner peripheral surface of the stepped part when the fixing part is disposed on the stepped part and the facing lateral surface abuts against the wall surface.

According to a fifth aspect, in the fourth aspect, the piston boot has an enlarged diameter region having a larger outer diameter than any of the first region and the second region between the first region and the second region. The enlarged diameter region fits into a peripheral groove formed in the inner peripheral surface of the stepped part.

According to a sixth aspect, in the fifth aspect, a largest outer diameter part of the enlarged diameter region is shifted from a central position between the facing lateral surface and an opposite lateral surface opposite to the facing lateral surface in the fixing part.

According to a seventh aspect, in any one of the fourth to sixth aspects, in the piston boot, the stretchable part extends from an opposite lateral surface of the fixing part opposite to the facing lateral surface.

According to an eighth aspect, in the first aspect, in the inner peripheral surface of the cylinder, an inner diameter of a third region abutting against the first region is larger than an inner diameter of a fourth region abutting against the second region.

According to a ninth aspect, in the eighth aspect, the piston boot has an enlarged diameter region having a larger outer diameter than any of the first region and the second region between the first region and the second region. The inner peripheral surface of the cylinder has a peripheral groove having a larger inner diameter than any of the third region and the fourth region between the third region and the fourth region.

According to a tenth aspect, a piston boot includes a stretchable part that is disposed between a tip side of a piston provided in a caliper of a disc brake and a stepped part formed in a cylinder opening of the caliper, the stretchable part being capable of expanding and contracting with movement of the piston. The piston boot has an annular fixing part that is formed on one end side of the stretchable part and fitted to the stepped part. The fixing part has an outer peripheral surface that abuts against an inner peripheral surface of the stepped part, an annular facing lateral surface that abuts against an annular wall surface of the stepped part, and an opposite lateral surface that is located opposite to the facing lateral surface in a piston axial direction and on which a base end of the stretchable part is provided. An outer diameter of the outer peripheral surface on the opposite lateral surface side is larger than an outer diameter thereof on the facing lateral surface side. Accordingly, erroneous assembling can be suppressed.

According to an eleventh aspect, in the tenth aspect, an annular protrusion is formed at an intermediate part of the outer peripheral surface in a piston axial direction. An outer diameter of the protrusion is larger than an outer diameter dimension of the facing lateral surface and an outer diameter dimension of the opposite lateral surface.

According to a twelfth aspect, in the eleventh aspect, a largest outer diameter part of the protrusion is shifted from a central position between the facing lateral surface and the opposite lateral surface in the fixing part.

INDUSTRIAL APPLICABILITY

According to the above-described disc brake and piston boot, it is possible to suppress the erroneous assembling of the piston boot.

REFERENCE SIGNS LIST

10: disc brake
11: disc
13, 14: pad
21: piston
23: piston boot
26: cylinder
35: bore
39: cylinder bottom part (bottom of cylinder)
43: opening
50: inner wall inner peripheral surface (inner peripheral surface of cylinder)
60: stepped part
61: stepped part wall surface (wall surface)
62: stepped part inner peripheral surface (inner peripheral surface of stepped part)
81: stretchable part
82: fixing part
102: back lateral surface (facing lateral surface)
103: opening-side lateral surface (opposite lateral surface)
104, 104A: outer peripheral surface
115, 115A: smaller outer diameter region (second region)
116: enlarged outer diameter region (enlarged diameter region)
117, 117A: larger outer diameter region (first region)
121: protrusion
122: largest outer diameter part
132, 132A: smaller inner diameter region (region facing second region, fourth region)
133: enlarged inner diameter region
134, 134A: larger inner diameter region (third region)
141: peripheral groove

The invention claimed is:

1. A disc brake comprising:
a piston that presses at least one of a pair of pads facing each other against both surfaces of a disc;
a cylinder that accommodates the piston to be movable and has a bore of which one end opens so that a tip of the piston protrudes; and
a piston boot that is disposed between a tip side of the piston and the cylinder and has a stretchable part capable of expanding and contracting with the movement of the piston,
wherein the piston boot has an annular fixing part that is formed on one end side of the stretchable part and abuts against an inner peripheral side of the cylinder, wherein an outer peripheral surface of the annular fixing part is provided with a first region that abuts against an inner peripheral surface of the cylinder, and a second region that is disposed closer to a bottom side of the cylinder than the first region in a piston axial direction,
wherein an outer diameter of the first region is larger than an inner diameter of a region of the inner peripheral surface of the cylinder that faces the second region, and
wherein in the inner peripheral surface of the cylinder, an inner diameter of a third region abutting against the first region is larger than an inner diameter of a fourth region abutting against the second region.

2. The disc brake according to claim 1,
wherein the piston boot has an enlarged diameter region having a larger outer diameter than any of the first region and the second region between the first region and the second region, and
wherein the enlarged diameter region fits into a peripheral groove formed on the inner peripheral side of the cylinder.

3. The disc brake according to claim 2,
wherein in the piston boot, the stretchable part is coupled to the fixing part on an opening side of the cylinder.

4. The disc brake according to claim 1,
wherein in the piston boot, the stretchable part is coupled to the fixing part on an opening side of the cylinder.

5. The disc brake according to claim 1,
wherein an annular stepped part on which the fixing part is disposed is formed on an opening side of the bore, and wherein the stepped part has an inner peripheral surface against which the outer peripheral surface of the fixing part abuts, and an annular wall surface that faces one annular facing lateral surface of the fixing part and is located on the bottom side of the cylinder, and
wherein the second region of the fixing part abuts against the inner peripheral surface of the stepped part when the fixing part is disposed on the stepped part and the facing lateral surface abuts against the wall surface.

6. The disc brake according to claim 5,
wherein the piston boot has an enlarged diameter region having a larger outer diameter than any of the first region and the second region between the first region and the second region, and
wherein the enlarged diameter region fits into a peripheral groove formed in the inner peripheral surface of the stepped part.

7. The disc brake according to claim 5,
wherein a largest outer diameter part of the enlarged diameter region is shifted from a central position between the facing lateral surface and an opposite lateral surface opposite to the facing lateral surface in the fixing part.

8. The disc brake according to claim 7,
wherein in the piston boot, the stretchable part extends from an opposite lateral surface of the fixing part opposite to the facing lateral surface.

9. The disc brake according to claim 6,
wherein in the piston boot, the stretchable part extends from an opposite lateral surface of the fixing part opposite to the facing lateral surface.

10. The disc brake according to claim 5,
wherein in the piston boot, the stretchable part extends from an opposite lateral surface of the fixing part opposite to the facing lateral surface.

11. The disc brake according to claim 1,
wherein the piston boot has an enlarged diameter region having a larger outer diameter than any of the first region and the second region between the first region and the second region, and
wherein the inner peripheral surface of the cylinder has a peripheral groove having a larger inner diameter than any of the third region and the fourth region between the third region and the fourth region.

\* \* \* \* \*